J. L. PERKINS AND F. W. SICKLES.
FLUID CONTROL FEED.
APPLICATION FILED AUG. 27, 1919.

1,372,903.

Patented Mar. 29, 1921.
5 SHEETS—SHEET 1.

FIG. 1.

WITNESS:
C. C. West

INVENTOR.
Julian L. Perkins,
Frank W. Sickles,
BY
Frank A. Cutter,
ATTORNEY.

J. L. PERKINS AND F. W. SICKLES.
FLUID CONTROL FEED.
APPLICATION FILED AUG. 27, 1919.

1,372,903.

Patented Mar. 29, 1921.
5 SHEETS—SHEET 3.

WITNESS:
C. C. West.

INVENTOR.
Julius L. Perkins,
Frank W. Sickles,
BY
Frank A. Cutter,
ATTORNEY.

UNITED STATES PATENT OFFICE.

JULIAN L. PERKINS, OF WEST SPRINGFIELD, AND FRANK W. SICKLES, OF SPRING-FIELD, MASSACHUSETTS, ASSIGNORS TO PERKINS APPLIANCE COMPANY, OF SPRINGFIELD, MASSACHUSETTS, A CORPORATION OF MASSACHUSETTS.

FLUID-CONTROL FEED.

1,372,903.  Specification of Letters Patent.  Patented Mar. 29, 1921.

Application filed August 27, 1919. Serial No. 320,101.

*To all whom it may concern:*

Be it known that we, JULIAN L. PERKINS and FRANK W. SICKLES, both citizens of the United States of America, said PERKINS residing at West Springfield, in the county of Hampden and State of Massachusetts, and said SICKLES residing at Springfield, in said county and State, have invented a new and useful Fluid-Control Feed, of which the following is a specification.

Our invention relates to improvements in means or mechanism for feeding the cutting implements of such machines as drill presses, milling machines, band-saw machines, and the like, and resides generally in fluid-operated and -controlled means for directly raising and lowering the cutting-implement carrier, valve mechanism for controlling said fluid-operated and -controlled means, said valve mechanism including or being supplemented by automatically and manually operated valve-operating means, controlling means for the return of the fluid to said fluid-operated and -controlling means, which includes a valve member, an implement-engaging member, and a yielding or resilient element interposed between the two, means to adjust said yielding or resilient element, and operating means for said fluid-return means, including a manually-operated member to unlock said last-named operating means, together with the necessary implement-supporting and -driving mechanism and work-holding elements, and such other subsidiary and auxiliary parts and members as may be necessary or desirable in order to render the feed complete and serviceable in every particular, all as herein set forth.

The primary object of our invention is to produce a feed, which is applicable to any machine having a cutting implement the feed of which is or may be limited by the greatest amount of material which it is practicable for said implement to remove, and by means of which the advance of the implement into the work or the penetration of the latter by the former automatically controls such penetration or rather the implement, that is to say, the implement is fed to the work only so fast as it can cut its way through the same, any obstruction or retardation of the implement immediately checking its advance, and any acceleration of penetration correspondingly accelerating the advance of the implement.

In the present embodiment of our invention the tension of a spring interposed between the work and a needle-valve may be said to be the direct feeding element. As the spring expands it forces the implement, a band-saw in the present example, onto or into the work and opens the needle-valve far enough to allow the proper amount of fluid to pass and thereby to allow the piston which supports the cutting-implement carrier and parts to descend. Any increased tension on and compression of the spring, as when the band-saw is from any cause checked in its downward movement, causes the needle-valve to be forced into a closed or partially closed position, whereby the descending parts and members are checked and the said saw is prevented from descending further until it cuts itself free, so to speak, when said needle-valve again opens and permits said saw to descend once more.

Another object is to provide such feed with adequate controlling means, both automatic and manual. In this connection it may be observed that the downward action or movement of the cutting implement and associated parts and members is not instantaneous, and that the pressure upon a dull or mutilated cutting implement is the same as that upon a keen or perfect implement, but the former does not drop or descend as fast as the latter, owing to the perfect control which is maintained by our feeding mechanism. It follows, therefore, that dull and mutilated implements can be used, in machines equipped with our feed, until such implements are completely used up or worn out. The cutting pressure is the same at all times. The control enables the implement and the other parts and members which rise and fall to rise rapidly, and either to descend under control while cutting, or to descend rapidly until the cutting position is approached, when they are checked and continue their descent under what might be termed the irregular cutting speed or rate. The aforesaid implement and parts and members can be stopped at any point. It is seen from the foregoing that what may be called the feeding speed is faster than what may be called the cutting speed. These elements are normally stopped on the way up by the position of a stop member, but they can be stopped when ascending by hand. As a matter of fact, said elements can be stopped at any point and at any time whether ascending or descending. All of this will appear more clearly in the description in detail which follows.

Still another object is to provide a feed whereby it is possible to increase both the speed and the time of doing a given piece of work or performing a given operation, as compared with the speed and time involved in doing the same work or the same operation in the old way and by the mechanism heretofore employed.

A further object is to provide means, in a feed of this character, whereby the operator is able to determine the highest surface speed and the greatest pressure that are practical for a given implement and a given material, in order that the greatest possible feeding presssure commensurate with the greatest possible surface speed is obtained.

Our feed is of a very delicate nature, as must necessarily be the case in order to produce the required results and provide a feed which is entirely practicable and highly efficient in all respects. The yielding or resilient element, in the operating means for the fluid-return controlling means, serves as a cushion between the force of gravity and the cutting implement or the pressure exerted by such implement. Said element automatically regulates the feed according to a predetermined pressure, instead of at a given rate of speed or movement, as is the case when the cutting implement is forced into the work by means of a screw or lever, for example. With our feed the cutting implement removes as much material as possible or practicable in a given time.

Other objects and advantages will appear in the course of the following description.

Oil is the fluid most commonly used in the fluid-containing members of our mechanism.

As previously stated our fluid-control feed is illustrated herewith in connection with a band-saw machine, for which it is especially well adapted, but its application to other kinds of machines is just as feasible, as hereinbefore intimated.

A preferred embodiment of our invention, whereby we attain the objects and secure the advantages of the same, is illustrated in the accompanying drawings, and we will proceed to describe said invention with reference to said drawings, although it is to be understood that the form, construction, arrangement, etc., of the parts and members in various aspects are not material and may be modified without departure from the spirit of the invention.

In the drawings, in which similar characters of reference designate similar parts throughout the several views, Fig. 12, a top plan and cross section taken on lines 12—12, in Fig. 15; Fig. 13, a top plan in partial section, on lines 13ª—13ª, Fig. 15; Fig. 14, an enlarged, right-hand, side elevation of the locking device for the operating means for the fluid-return controlling means, and of the manually-operated, unlocking member, and, Fig. 15, an enlarged, central, vertical section of the controlling means for the return of the fluid to the fluid-operated and -controlled means, parts being in elevation.

Figure 1:
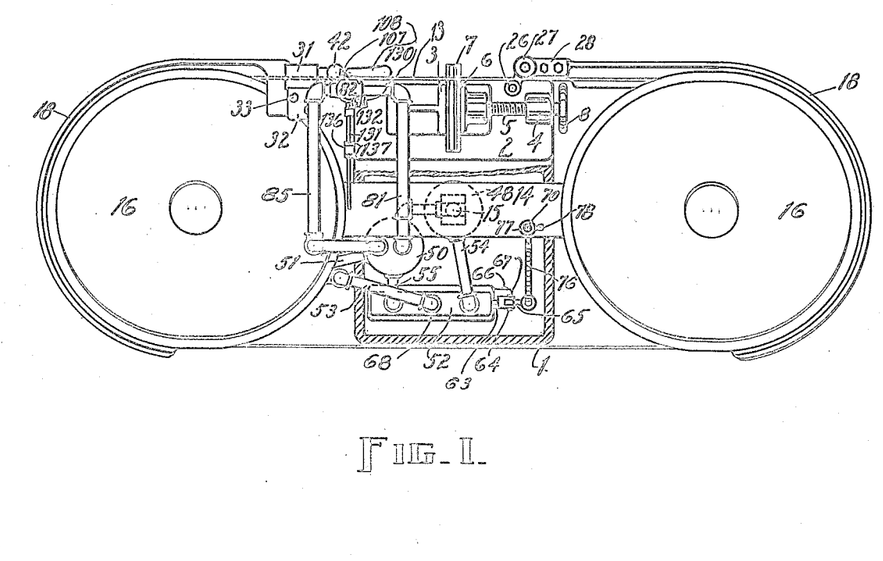
Figure 1 is a top plan, with parts in section, of a fluid-control feed, which embodies our invention as aforesaid, applied to a band-saw machine.
Figure 2:
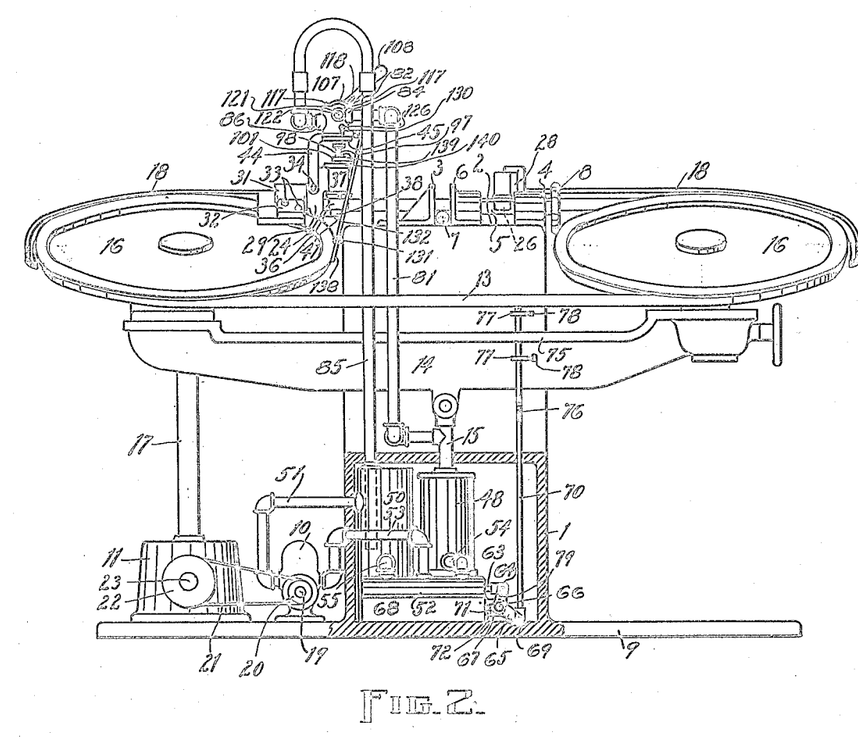
Fig. 2, a front elevation, with parts in section, of said machine and feed.

Referring first more especially to the first two views, it will be seen that a housing 1 is provided for supporting and inclosing certain portions of the mechanism. The housing 1 has an elevated-table or bed 2 at the rear end. Mounted on the bed 2 is a fixed work-holding member or jaw 3, and an internally screw-threaded bearing 4 for a horizontal screw 5. The screw 5 at its inner end carries a work-holding member or jaw 6 which coöperates with the jaw 3 to hold a piece of work, as 7, while being cut. The screw 5 is operated by means of a hand-wheel 8 at the outer end. The housing 1 is mounted on a base 9, which is omitted from Fig. 1, and at the left of said housing, on said base, is a pump 10, and at the left of said pump a gear-case 11. The pump 10 is a part of the feed mechanism.

A band-saw is represented at 13. The carrier for the band-saw 13 comprises a horizontal beam 14 provided with a central, depending plunger 15, and equipped with obliquely arranged pulleys 16—16 around which said saw passes, and which drive said saw. The arrangement is such that the rear reach of the band-saw is on a higher plane than the front reach thereof. A shaft 17 rises from the gear-case 11, and is driven from a motor (not shown), and in turn drives the left-hand pulley 16. Inasmuch as the beam 14, with all of the parts and members, carried thereby, has a vertical movement, provision must be made to enable such movement to take place without disengaging the parts driven by the shaft 17. A guard 18 is provided for each pulley 16, such guard being attached to the beam 14.

From the above brief description of the band-saw machine, or of the parts thereof with which we are concerned at this time, it is clear that, whenever the beam 14 is carried up or permitted to descend by the plunger 15, the pulleys 16, while revolving, the band-saw 13, the guards 18, and whatever may be affixed to said guards are raised or lowered accordingly.

It is not the purpose here to enter into a more complete description of the band-saw machine *per se*, inasmuch as it forms no part of the present invention except in a general way.

The pump 10 has a shaft 19, secured to which is a pulley 20, and this pulley is connected by a belt 21 with a pulley 22 that is secured on a shaft 23 which forms part of the mechanism contained in the gear-case 11. Thus the pump 10 is operated from the same source and at the same time as the band-saw 13 is operated, although this is merely incidental.

Since the band-saw 13 is carried at the usual inclination by the pulleys 16, it is necessary to change the inclination of that portion of said saw, which comes into contact with the work 7 and does the cutting, to the vertical. To this end two pairs of rollers are provided each side of the said work. The rollers at the left of the work 7 are respectively indicated by the numerals 24 and 25, and those at the right of said work are respectively designated by the numerals 26 and 27. The rollers 26 and 27 are respectively in front of and behind the back reach of the band-saw 13, and they are revolubly connected with a bracket 28 which is attached to the right-hand guard 18. The rollers 24 and 25 are respectively in front of and behind the aforesaid reach of the band-saw, and are supported by a bracket 29 in the manner presently to be explained. The bracket 29 has a hub 30 which is received in a socket 31 at the rear end of an arm 30$^a$. The arm 30$^a$ is bolted at 33—33 to the left-hand guard 18. The hub 30 enters the socket 31 from the right-hand side thereof. There is a wide, vertical slot 32 in the hub 30, which slot opens through the bottom of said hub and extends through the bottom of the socket 31 to accommodate the band-saw 13 and afford the necessary space for the adjustment of said saw. The bracket 29 is provided with two, diametrically - opposite, horizontal, adjusting bolts 33$^a$ and 34, and a lug 35 extends to the right, from the upper part of the socket 31, in between said bolts. By means of the bolts 33$^a$ and 34 the bracket 29, with the rollers 24 and 25, can be adjusted so as to cause that part of the band-saw 13 which passes between said rollers to assume a vertical position. The parts and members just described are most clearly shown in Figs. 10, 11, 12, and 15. The adjustment required to be effected through the medium of the bolts 33$^a$ and 34 and the lug 35 is comparatively slight, but owing to such adjustment it is necessary to render flexible certain portions of tubular members of the feed, as will be more clearly seen from the description to follow of said feed.

Figures 12, 13, 14, 15:
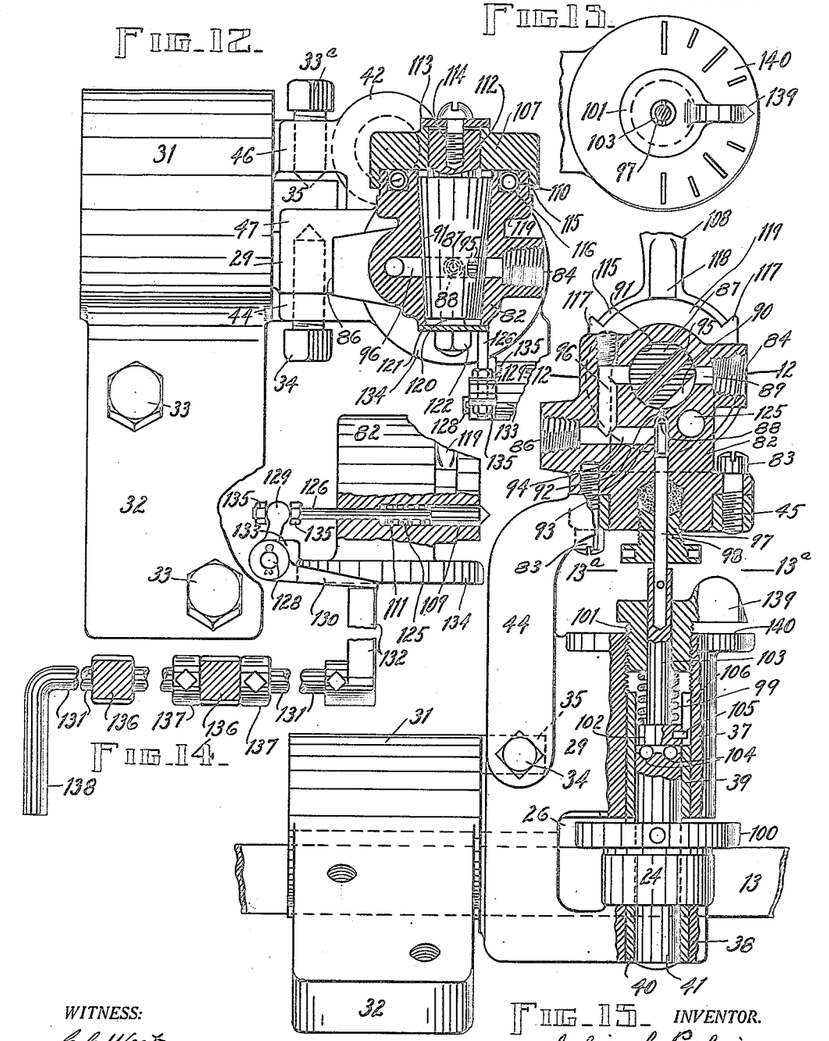

The right-hand end of the bracket 29 is divided by a horizontal opening 26 into upper and under parts which form upper and under bearings 37 and 38, respectively, as shown in Fig. 15. Within the bearings 37 and 38 are bushings 39 and 40, respectively, and journaled in said bushings is a short vertical shaft or spindle 41. The roller 24 is mounted on the spindle 41 in the space 36 directly above the bearing 38, resting and rotating on said bearing or on the upper end of the bushing 40. Behind the bearing 37 and integral therewith is a vertical bearing 42, as shown in Fig. 11, and a spindle 43, which is journaled in said last-named bearing, carries at its lower, protruding terminal the roller 25.

An arm 44 rises from the bracket 29, and has at the top a horizontal, annular seat or support 45 the axial center of which is in line with the axis of the spindle 41—see Figs. 2 and 15.

Figures 7, 8, 9, 10, 11:
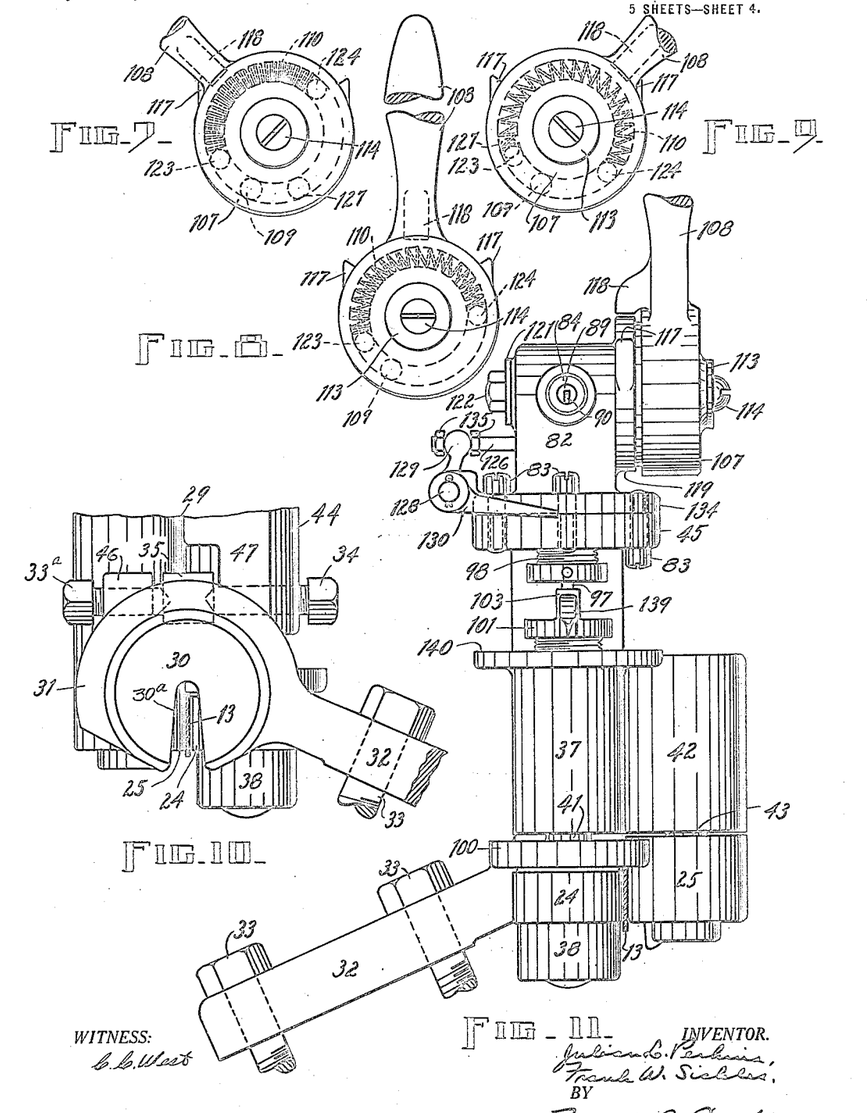
Fig. 7, an enlarged, rear elevation of said last-named means, showing the handle thrown over into its extreme left-hand position, in which position the valve operated through the medium of said handle is completely closed.
Fig. 8, a similar view, showing said handle in central or neutral position, in which position said valve is open to the needle-valve passage.
Fig. 9, another similar view, showing said handle in its extreme right-hand position, in which position said valve is wide open, or so positioned as to by-pass by said needle-valve passage.
Fig. 10, an enlarged, left-hand, side elevation of the adjustable clamping means for the fluid-return controlling means, or for the bracket and casing therefor.
Fig. 11, an enlarged, right-hand, side elevation of said casing and associated parts.

The lugs on the bracket 29 for the bolts 33$^a$ and 34 appear at 46 and 47, respectively, in Figs. 10 and 12.

We will now proceed to describe in detail the fluid-controlled feed by means of which the plunger 15 is operated and controlled, it being through the medium broadly or generally of said plunger that the band-saw 13 is raised and lowered and regulated during the cutting operation.

The fluid-operated and -controlled means of the feed comprises, with the pump 10 and the plunger 15, a vertical cylinder 48 within the housing 1, a piston 49 at the base of said plunger within said cylinder, an oil tank 50 also within said housing, a conduit 51 connecting said tank with said pump, a horizontal, open-ended cylinder 52 in front of said vertical cylinder, a conduit 53 connecting said pump with said horizontal cylinder, a conduit 54 connecting said vertical and horizontal cylinders, and a conduit 55 connecting said tank and said horizontal cylinder, as illustrated in Figs. 1, 2, 3 and 4. The cylinder 48 has a lining 56, and the cylinder 52 also has a lining 57, as is customary.

When the pump 10 is in operation, and the entrance to the cylinder 48 beneath the piston 49 open, oil is drawn from the tank 50 through the conduit 51 into said pump, and forced through the conduit 53, the cylinder 52, and the conduit 54 into said first-named cylinder, and forces upwardly said piston with the plunger 15, the beam 13, and all parts and members mounted on and carried by said beam. Conversely, upon closing the entrance to the cylinder 48 and opening the entrance from the cylinder 52 to the tank 50, by way of the conduit 55, the oil pumped into said cylinder 52 by-passes into said tank, and the oil in the cylinder 48 escaping by means hereinafter described the piston 49 with its load descends, displacing the oil beneath said piston and forcing it through conduits presently to be described back into said tank. In this manner does the primary fluid-operated and -controlled means operate.

Figures 3, 5, 6:
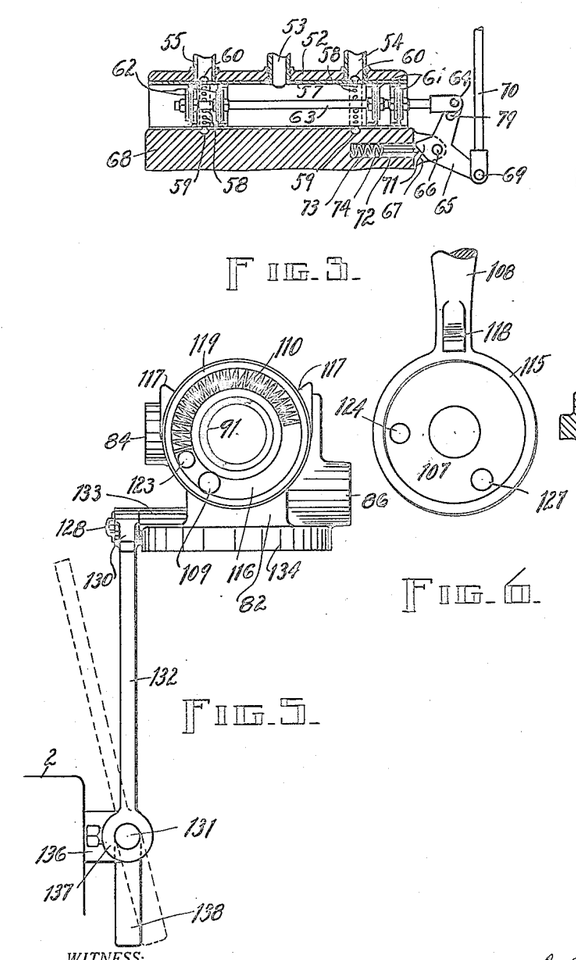
Fig. 3, an enlarged, central, longitudinal, vertical section through the valve mechanism which controls the fluid-operated and -controlled means.
Fig. 5, an enlarged, rear elevation of parts of the operating means for the fluid-return controlling means, and of the locking and unlocking mechanism therefor.
Fig. 6, an enlarged, inside elevation of the handle-provided member of said fluid-return controlling operating means.
Figure 4:
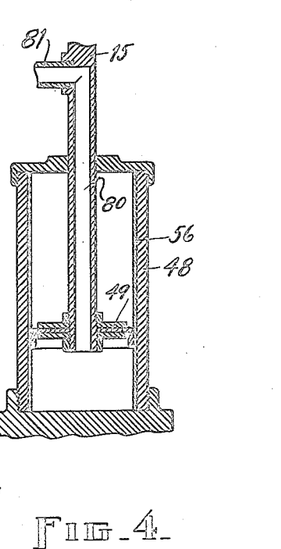
Fig. 4, an enlarged, central, vertical section through said fluid-operated and -controlled means.

The valve mechanism, for controlling the above-described means, and with which are included means for operating said mechanism, is shown in Figs. 1, 2, and 3, and will next be described. It is desired to note first, however, that, while the conduit 53 opens through the lining 57, the conduits 54 and 55 only open through the cylinder 52, and there is a series of perforations 58 in said lining in line with each of said last-named conduits, and an annular groove 59 in said cylinder around such perforations and into which the latter open. The oil, therefore, passes from the interior of the lined cylinder 52 through one or the other series of perforations 58 into one or the other of the grooves 59 into the conduit 54 or 55, as the case may be. The bases of the conduits 54 and 55 are slotted, as at 60, to register with the grooves 59. This construction is necessary in order to provide suitable wearing surfaces for valves.

Two pairs of valves of the piston type are provided in the lined cylinder 52, which, although all may be alike, are designated by different numerals for the sake of simplifying the explanation, the right-hand pair being designated by the numeral 61 and the left-hand pair by the numeral 62. The valves 61 and 62 are mounted on a horizontal stem or rod 63 which has its right-hand end pivotally connected at 64 with the upper end of a bell-crank-lever 65. The ends of the cylinder 52 are left open and the valves 61 and 62 are provided in pairs in order that the movement of said valves shall be free, which would not be the case if oil were permitted to become pocketed at either end of said cylinder. The valves 61 and 62 themselves close the ends of the cylinder 52, so that no oil can escape therefrom. The construction and arrangement of parts are such that the left-hand perforations 58 are closed by the valves 62, that is to say, said perforations open into the space between said valves and no escape from such space into the lining 57 in either direction is possible, and the valves 61 are both beyond to the right of the right-hand perforations, which latter are, therefore, open so that oil can pass from said lining, between the adjacent valves 61 and 62, into the conduit 54, when the rod 63 is at the right-hand end of its travel; while just the reverse of this is true when said rod is at the left-hand end of its travel, the right-hand perforations 58 then opening between the valves 61, and both of the valves 62 being at the left of the left-hand perforations 58, so that the way is open from said lining, between the adjacent valves 61 and 62, to the conduit 55. The first position (see Fig. 3) is that when the piston 49 is caused to ascend, and the second position is that when said piston is permitted to descend.

The bell-crank-lever 65 is pivoted at 66 to a lug 67 that projects from the right-hand end of the bed 68 of the cylinder 52. One arm of the bell-crank-lever extends upwardly and the other end extends to the right, and to the free end of the latter arm is pivoted at 69 the base of a vertical, operating rod 70. The bell-crank-lever 65 has an angular heel 71 for engagement with the pointed, protruding nose of a horizontal, spring-pressed pin 72 in the bed 68. The pin 72 slides in a passage 73 in the bed 68, which passage opens through the right-hand end of said bed. The spring 74 is located in the passage 73 between the inner end of said passage and the inner end of the pin 72, and forces said pin into engagement with the heel 71. The rod 70 passes upwardly through the top of the housing 1 and through a flange 75 on the beam 14, there being an offset in said rod at 76 to enable the same to pass through said flange. Mounted on the upper terminal of the rod 70, above and below the flange 75, are two collars 77. These collars are rendered adjustable on the rod 70 by means of screws or bolts 78—78.

When the beam 14 is ascending and as it approaches the upper end of its travel, the flange 75 encounters the upper collar 77 and lifts the rod 70. The rod 70 in moving upwardly rocks the bell-crank-lever in such a manner that the valve rod 63 is actuated to the left and carries with it the valves 61 and 62, said valves being thus carried into position to close the entrance to the conduit 54 and open the entrance to the conduit 55. The oil pumped into the cylinder 52 now by-passes through the conduit 55 back to the tank 50, and the piston 49 descends in the cylinder 48 as fast as the oil beneath said piston is displaced. The plunger 15 with the beam 14 and its load descend with the piston 49.

Of course, if displacement of the oil beneath the piston 49 be prevented, for which provision is made as will subsequently appear, the descent of the parts is prevented, or caused to cease upon application of the means of obstruction to such displacement. Assuming that the piston 49 is descending without interference sufficient to stop it, the descent will continue until the flange 75 encounters the lower collar 77 and forces downwardly the rod 70. Then the rod 70 rocks the bell-crank-lever 65 back to its former position and so disposes the valves 61 and 62 as to permit the oil to be again pumped into the cylinder 48, when the piston 49 again rises. It follows, therefore, that, in the absence of any interfering medium, the vertical reciprocation of the plunger 15 and its load may continue indefinitely. The rod 70 may be raised to start the parts upwardly and lowered to start the parts downwardly, from any position between the limits of travel of the beam flange 75, by hand.

As the bell-crank-lever 65 is rocked in either direction on its pivot 66 the heel 71 forces the pin 73 inwardly against the resiliency of the spring 74, and as the extreme outer edge of said heel passes the point of said pin said spring is powerful enough to act to thrust said pin outwardly with sufficient force to cause said lever to snap into its changed position. Provision of this kind is needed in order to insure to the valves 61 and 62 the completion of their stroke in either direction, otherwise it might occur that the rod 70 would stop, by reason of the cessation of movement of the beam flange 76, before said valves had completed said stroke.

There is a slot 79 in the bell-crank-lever 65 to accommodate the pivot 64 and enable said lever to actuate the rod 63.

Passing now to the controlling means for the return of the fluid to the fluid-operated and controlled means, or, specifically, to the tank 50, it should be observed first that there is a passage 80 in the plunger 15, which passage opens at the bottom beneath the piston 49, and at the top into a conduit 81. The conduit 81 leads from such hollow portion of the piston 15 to a valve casing 82. The casing 82 is mounted on and in the arm ring 45 and there secured by means of a plurality of bolts 83. The upper terminal portion of the conduit 81 is flexible in order to enable the bracket 29, from which the valve-casing 82 is supported by means of the arm 44, to be adjusted with the aid of the bolts 33ª and 34 in the manner hereinbefore described. The conduit 81 at its upper end is connected at 84, Figs. 11, 12 and 15, with the casing 82. A conduit 85 is connected at its upper end, at 86, Figs. 12 and 15, with the casing 82, and extends downwardly through the top of and into the tank 50. The upper terminal portion of the conduit 85 is made flexible for the same reason that the corresponding portion of the conduit 81 is so made. Both of the conduits 81 and 85 move up and down with the plunger 15 and casing 82, and said conduit 85 is of sufficient length to enable it to slide up and down in the tank 50 without becoming disconnected from said tank.

Obviously oil from the cylinder 48 below the piston 49 can escape, upon the descent of said piston, through the passage 80, and pass through the conduit 81, the valve casing 82, and the conduit 85 back to the tank 50, provided, however, that the passage between the valve-casing intake 84 and outlet 86 be open.

Referring particularly to Figs. 12 and 15, it will be seen that the valve casing 82 is provided with a horizontal plug valve 87 and a vertical needle-valve 88, and that the intake 84 and the outlet 86 may be connected, according to the position of said plug valve, either through a short, horizontal passage 89 in said casing, a lateral port 90 formed by the wall of the seat for said plug valve and a recess or groove in said last-named valve, and a seat 92, for said needle-valve, a vertical passage 93, and a horizontal passage 94, all in the casing, or through said passage 89, a transverse port 95 in said plug valve, an angular passage 96 in the casing, and the outer portion of said passage 94. The valve 87 is received in a horizontal, tapered bore or passage 91 in and through the casing 82, the walls of which passage form the seat for said valve. The needle-valve 88 is necessarily smaller than the passage 93 in which said valve is located and operates. Said needle-valve has a stem 97 below, which passes through a stuffing-box 98 in the bottom of the valve casing 82.

When the plug valve 87 is positioned as shown in Fig. 15, the oil forced out of the cylinder 48 by the piston, by way of the plunger passage 80, passes through the conduit 81 to the valve casing 82, entering the latter at 84, passes through the passage 89, the port 90, the seat 92, the passage 93, and the passage 94, leaving said casing at 86 and reaching the tank 50 through the conduit 85, but said oil can flow through said seat only as fast as the needle-valve 88 permits, and, if said valve be closed altogether, the flow of oil is shut off completely. The piston 49 can descend only as fast as is permitted by the needle-valve 88, the higher said valve is raised the slower being the descent of said piston, until the seat 92 is fully closed by said valve, when such descent ceases altogether, and the lower said valve is permitted to go, until said seat is wide open, the faster said piston descends. Positive but very delicate or sensitive control of the descent of the piston 49 is thus obtained, and such control is rendered very much more delicate or sensitive or greatly augmented by a spring 99 that is arranged to cushion the reciprocable movement of the needle-valve, further consideration of which spring will be left until later.

If the plug valve 87 be partially rotated to the left, or in the direction contrary to the movement of the hands of a clock, the needle-valve seat 92 is closed by said valve and the flow of oil through the valve casing is completely cut off, consequently no downward movement of the piston 49 can take place. It is while the valve 87 is thus disposed that the oil is fed in beneath the piston 49 and the latter thereby forced upwardly.

If the plug valve 87 be partially rotated to the right, or in the direction of the hands of the clock, the port 95 is brought into line with the passage 89 and the horizontal branch of the passage 96, which branch is in the same plane with said passage 89, and the oil has a free and clear passage through the valve casing 82. When the oil thus flows freely through the casing 82 and the valve 87, the piston 49 is able to descend at a fairly rapid rate of speed.

The first of the above-described positions of the plug valve 87 is termed the feeding position, the second of such positions, the closed position, and the third, the open position.

A follower or rider 100, in the form of a disk, is secured to the spindle 41 above the roller 24, with which latter said rider may be integral, and rests and bears on the upper edge of the band-saw 13. The spring 99 is interposed between an adjustable plug 101, at the upper end of the bearing 37, and a collar 102 at the base of an extension 103 of the needle-valve stem 98, and forces said collar and the connected parts downwardly. A plurality of balls 104, interposed between adjacent ends of the collar 102 and the spindle 41, forms an anti-friction bearing at the upper end of said spindle. The collar 102 has a pin 105 extending laterally therefrom into a vertical slot 106 in the bushing 39 to prevent said collar and attached parts from rotating, without interfering with the reciprocation thereof.

The spring 99, acting through the collar 102, balls 104, and spindle 41, which latter has longitudinal as well as rotary movement in the bushing 39, forces the rider 100 down on the band-saw 13, and does this with a pressure that may be varied by increasing or decreasing the tension of said spring. At the same time, said spring, acting through the collar 102 and the extension 103, draws the needle-valve 88 down away from the seat 92, so that such seat is opened. But, in the event the band-saw 13 encounters any obstruction which interferes with its progress in cutting, or for any reason such progress is interfered with, the rider 100 is forced upwardly by said saw, and carries with it the spindle 41, the extension 103, and the needle-valve 88. The needle-valve 88 is thus caused partially or entirely to close its seat 92, and so to retard still further or stop altogether the descent of the piston 49 with the plunger 15 and its load. As soon as the band-saw cuts itself free and resumes the normal cutting operation, the spring 99 is permitted to expand, when said spring causes the needle-valve to be again opened if fully closed, or again opened wider if the closing be not complete, when the normal descent of the plunger 15 and its load is resumed.

The tension of the spring 99 required to maintain the needle-valve 88 in the proper position relative to the seat 92, to permit the requisite amount of oil to pass through said seat, in order to enable the plunger 15 with its load to descend at a speed commensurate with the ability of the band-saw 13 to cut its way into and through the work, under the best conditions and at the maximum, safe rate of speed is first determined. And all of the parts and members carried by the beam 14, including the band-saw 13 as it performs its normal cutting operation, the rider 100, the needle-valve 88, and the seat 92, descend at the same rate of speed, until from any cause said saw fails to descend as fast as the others of said parts and members, in other words, progress downwardly of said saw is checked or arrested, then, of course, the downward travel of the rider 100 is arrested and the needle-valve forced toward or into its seat, with the result that the downward travel of all of the parts is partially or entirely arrested, to be resumed as soon as the band-saw begins to descend again. It follows from this that the band-saw is permitted to descend only so fast as it cuts its way through the work, and that it is prevented from being injured or unduly worn.

The operating means for the fluid-return-controlling means, which latter includes the plug valve 87, apart from the feeding means of which the needle-valve 88 constitutes an important element, comprises a spring-actuated hub 107 having a handle 108, and a spring-pressed latch 109 — see especially Figs. 5, 6, 7, 8, 9, 11, 12, 14 and 15. The spring for the hub 107 is represented at 110, and the spring for the latch 109 appears at 111 in Fig. 14. The plug valve 87 is arranged in the valve casing 82 with the smaller end forward and the larger end rearward, and a stem 112 extends rearwardly from said larger end, and has the hub 107 mounted thereon and attached thereto by means of a washer 113 and a screw 114. An annular flange 119 is formed on the back side of the casing 82, which flange encircles the bore 91 for the valve 87. The hub 107 has a forwardly-extending flange 115 which encircles and is mounted on the back portion of the flange 119. The flange 119 has an annular recess 116 therein, which opens through the back side thereof, to receive the spring 110, and such flange is provided with two radial lugs or stops 117 located, in the present case, on the periphery of the forward portion of said flange, and at equal distances from the vertical center thereof. The handle 108 is provided with a finger or lug 118 which extends over the top of the forward portion of the flange 119, and is arranged and designed to contact with either of the stops 117, according to the direction in which said handle is moved.

The valve 87 has a screw-threaded spindle or projection 120, at the front end, to receive a washer 121 and a nut 122, by means of which said valve is held in place at such end, and adjusted for the purpose of taking up wear.

One end of the spring 110 is attached to a post 123 in the channel 116, and the other end of said spring is received against a post 124 which projects forwardly from the hub 107 into said channel. The construction and arrangement of these parts are such that the spring 110 has a constant tendency to urge the hub 107 to the right, the movement in such direction being limited by the lug 118 and the right-hand stop 117. When the hub 107 with its handle 108 is thus located, which position is shown in Figs. 1, 2 and 9, the valve 87 is in closed position. When the handle 108 is thrown over to the left as far as the left-hand stop 117 permits, as indicated in Fig. 7, the spring 110 is under full compression, and the valve 87 is in open position. When the handle 118 stands vertically, as illustrated in Fig. 8 and a number of the other views, the valve 87 is in feeding position.

The feeding position of the parts just described is maintained by means of the latch 109. Said latch is located in a horizontal passage 125 in the valve casing 82. The passage 125 opens through the back side of the flange 119. The spring 111 is located in the passage 125 between the inner end of said passage and the corresponding end of the latch 109. The latch 109 has a forwardly-extending stem 126 which passes through a constricted continuation of the passage 125, and out of the front end thereof beyond the corresponding face of the casing 82. The rear end of the latch 109 is rounded or made conical in shape, and there is in the inside face of the hub 107 a recess 127 to receive such end of said latch, said recess being so positioned as to cause the parts to be in feeding position, the handle 108 then standing vertically, when the latch is in locking engagement with said hub.

Upon grasping the handle 108 and moving it to the left, the valve 87 will be partially rotated, through the medium of the hub 107 and connections. The spring 110 moves the parts to the right when the handle 108 is released by the hand or by the latch 109. The spring 111 may have sufficient strength to cause the latch 109 to stop the hub 107 with connected parts in feeding position, when the handle 108 is released by the hand holding it with the parts in open position.

The handle 108 is forced over, against the resiliency of the spring 110, until the lug 118 encounters the left-hand stop 117, when it is desired to permit the plunger 15 with its load to descend quickly. Said handle is released to its spring and permitted to assume either of the other two positions, accordingly as it be desired to have the parts descend under the influence of the needle-valve 88, or when the plunger with its load is to rise.

The force of the engagement between the latch 109 and the recessed part 127 of the hub 107 is insufficient to prevent the operator from disengaging these parts by means of the handle 108 whenever necessary.

Provision is made for unlocking the hub 107, from a position in front of the machine, when the plunger 15 with its load is descending. For this purpose we provide the stem 126, a rock-shaft 128, a lever 129, and a dog 130, and a horizontal rock-shaft 131, and an arm 132, as illustrated in Figs. 1, 5, 11, and 14. The rock-shaft 128 is mounted in a horizontal bearing 133 which is formed on a base 134 of the valve casing 82, and the axis of which is at right-angles to the axis of the valve 87. The rocker-arm 129 has its lower end mounted securely on the rock-shaft 128, and is forked at the upper end to receive the foremost terminal portion of the stem 126 and to be received between nuts 135 on said stem, so that, as said arm is rocked forwardly said stem and the latch 109 are actuated in the same direction, against the resiliency of the spring 111, and said latch is thus withdrawn from locking engagement with the hub 107. The dog 130 is secured at one end to the rock-shaft 128, and extends rearwardly from said shaft. The rock-shaft 131 is journaled in lugs 136—136 which extends to the left from the table 2. Collars 137—137 with suitable bolts are employed both sides of either or both of the bearings 136 on the rock-shaft 131 to hold the latter against endwise movement. The rock-shaft 131 extends transversely of the machine, and the arm 132 is secured to the rear end of said shaft and extends upwardly into position to be engaged by the dog 130 when said arm is standing vertically. The point at which the hub 107 is unlocked by means of the dog 130 depends upon the length of the arm 132. The action produced by the arm 132 takes place, of course, before the piston 49 reaches the end of its downward travel. At the front end of the rock-shaft 131 is a handle 138. By means of the handle 138 the rock-shaft 131 may be actuated to locate the upper end of the arm directly beneath the dog 130, or out of such position.

Thus, when the plunger 15 with its load is descending, and it is desired to release the hub 107 from the latch 109, the operator actuates the arm 132 from the dotted line position to the full line position in Fig. 5, and the descending dog 130 then encounters the upper end of said arm and is thereby rocked upwardly. The upward movement of the dog 130 actuates the rock shaft 128 in such a manner as to cause the rocker-arm 129 to draw forward the stem 126, against the resiliency of the spring 111, and so to disengage the latch 109 from the hub 107, or to cause said latch to release said hub. This manually-operated, unlocking mechanism is used when it is desired to stop further downward movement of the rising and falling elements, including the band-saw 13, as previously observed or intimated. The result is accomplished by reason of the fact that, upon the release of the hub 107, the spring 110 acts to close the valve 87 so that no more oil can escape from beneath the piston 49, such action occuring at a time when the entrance to the conduit 54 is closed. Before starting the elements downwardly again it is necessary to throw the arm 132 over to one side so that it will be out of the path of the dog 130 when it again descends. In order to start the elements downward, after actuating the arm 132 from engaging position beneath the dog 130, it is necessary to grasp the handle 108 and throw the valve 87 into feeding position, or into open position should it be desired to have said elements complete their descent more rapidly than would be the case if said valve were disposed in feeding position.

Referring more especially to Figs. 11, 13, and 14, it will be seen that the adjusting device for the spring 99 consists of the plug 101, which is tapped into the upper end of the bearing 37, and provided with a combined handle and pointer 139, and a dial 140 on top of said bearing. The tension of the spring 99 is increased by screwing the plug 101 downwardly, and decreased by screwing said plug upwardly. The member 139 affords a convenient means both for adjusting the plug 101 and, with the dial 140, for determining the amount of compression of the spring 99, as will readily be understood. The tension of the spring 99 should be commensurate with the degree of hardness of the material to be cut by the band-saw 13, so as to enable the latter to cut to the best advantage.

Having described the machine and its parts in detail, we will now explain the operation of said machine as a whole.

It is assumed that the bracket 29 has been adjusted, if necessary, to cause the rollers 24 and 25 to hold the cutting reach of the band-saw 13 in a vertical plane, transversely of such reach; that the work 7 is in position; that the member 139 has been so positioned relatively to the dial 140 as to place the spring 99 under the compression necessary to hold said saw down on said work, and at the same time to enable said spring to yield in the event the downward progress of said saw be interrupted; that the arm 132 is out of the path of the dog 130, in the position indicated in full lines in Figs. 1 and 2 and by dotted lines in Fig. 5; that the collars 77 are set to reverse the piston 49 at both ends of its travel, when the beam 14 with its load has arrived at a predetermined height and a predetermined depth; that the valves 61 and 62 are respectively disposed to open the entrance to the conduit 54 and close the entrance to the conduit 55; that the handle 108 is in closed position; and that the pump 10 is in action and the shaft 17 revolving. Oil is being pumped into the cylinder 48, the plug valve 87 is closed, and the piston 49 is rising and carrying with it the plunger 15 and the beam 14 with the parts and members supported on and by said beam, including the band-saw 13 which is at the same time traveling around its endless course on the pulleys 16. The beam 14 continues to rise until the flange 75 encounters the upper collar 77, when said collar and the rod 70 are carried upwardly, and the bell-crank-lever 65 is caused to rock on its pivot 66 and force the rod 63 with the valves 61 and 62 to the left, thereby shutting off the oil to the underside of the piston 49, and permitting said oil to by-pass back to the tank 50. There being no escape for the oil beneath the piston 49, said piston is held stationary and supports the load in the most elevated position permitted by the upper collar 77. The load can ascend no higher, or rather there is now no power available or active to force said load higher, neither can it descend, because there is no avenue of escape open for the oil imprisoned or confined between the closed valve 61 and the closed valve 87.

The operator next throws the handle 108 into feeding position, when the oil confined between the valves 61 and 87 begins to escape through the valve seat 92, passing through only so fast as the needle-valve 88 permits, however. Immediately the piston 49 begins to descend slowly, and, it may be, somewhat intermittently, or in any event at varying rates of speed, incident to the fluctuation which the needle-valve 88 undergoes as the band-saw 13 cuts its way into and through the work 7 more or less haltingly. Usually the maximum rise of the band-saw is but little above the work, so that said saw commences to cut very soon after the piston 49 starts downwardly.

The use and effect of the spring 99 during the cutting operation has hereinbefore been fully explained. Without this spring the rider 100 would frequently fail properly to follow and bear on the band-saw 13, and such failure would cause the needle-valve 88 to close its seat 92 to a greater extent than necessary, with the result that the parts would not descend as rapidly as said saw would be able to cut a way for itself into the work, and there would be a loss of time and efficiency. With the rider 100 held in constant contact with the band-saw as the latter travels beneath said rider and causes the same to revolve, the downward feed of said saw must correspond or be commensurate with the speed at which said saw cuts its way, and all danger of injury to the saw or breakage of the teeth thereof is eliminated.

Directly after the band-saw cuts through the bottom of the work 7, or finishes its cut before reaching such bottom, as the case may be, the flange 75 encounters the under collar 77 and thereby forces downwardly the rod 70. Said rod, acting through the bell-crank-lever 65, causes the rod 63 with the valves 61 and 62 to be moved to the right. Said valves again open the inlet to the cylinder 48 beneath the piston 49 and close the entrance to the conduit 55. Meanwhile the handle 108 is thrown over to the right into closed position, and the piston 49 rises once more. The arm 132 may be and usually is of the right length to cause the hub 107 to be unlocked just as the piston 49 arrives at the bottom of its travel, in which event the valve 87 is closed through the medium of said arm, instead of being closed by applying the hand to the handle 108.

While the parts are ascending the work is readjusted or replaced with another piece, ready for the band-saw when next it descends.

These operations may continue indefinitely.

In the event it be desired for any reason, as, for example, when the feed is set for work of a large size and it has to be set for work of a smaller size, or the band-saw is to act on work of a smaller size, to cause the piston 49 and its load to descend rapidly, the handle 108 is thrown clear over to the left into open position, being thrown back again, or released to the spring 110, as soon as said piston has descended a sufficient distance. If the handle 108 be thrown into intermediate position, the feeding operation commences, and, if into the extreme right-hand position, all downward movement of the parts is stopped.

Both the rod 70 and the hub 107 can be operated at any time to stop the piston 49 when traveling in either direction, consequently complete manual control of the feed is always available.

If the arm 132 be of proper length to operate the dog 130 to cause the hub 107 to be unlocked, at the time the piston arrives at the bottom of its travel, approximately, and be left set beneath the dog, the feed becomes automatic in all except one respect, namely: it is necessary to throw the handle 108 into feeding position by hand, at the end of the upward travel of said piston.

The balls 104 enable the spindle 41 to rotate freely beneath the collar 102, as the traveling band-saw revolves the roller 24 and the rider 100 and with them said spindle.

What we claim as our invention, and desire to secure by Letters Patent, is—

1. In a fluid-control feed, a penetrating implement, and controlling means for said implement, said means being subject to the resistance to the penetrating action of said implement.

2. In a fluid-control feed, a penetrating implement, and controlling means for said implement, said means being in contacting relation with said implement.

3. In a fluid-control feed, a penetrating implement, and controlling means for said implement, said means contacting yieldingly with said implement.

4. In a fluid-control feed, a penetrating implement, controlling means for said implement, said means being in contacting relation with said implement, and means to regulate the force of such relation.

5. In a fluid-control feed, a fluid-operated member, a carrier operatively connected with said member and equipped with a penetrating implement, and means capable of governing the feed of said implement by the amount of resistance to penetration of the work by said implement.

6. In a fluid-control feed, a fluid-operated member, a carrier operatively connected with said member and equipped with a penetrating implement and means under the influence of said implement to regulate the feeding operation by the amount of resistance to penetration of the work by said implement.

7. In a fluid-control feed, a fluid-operated member, a carrier operatively connected with said member and equipped with a penetrating implement, and means moving with said carrier and under the influence of said implement to regulate the feeding operation by the amount of resistance to penetration of the work by said implement.

8. In a fluid-control feed, a fluid-operated member, a carrier operatively connected with said member and equipped with a penetrating implement, and means moving with said carrier and influenced by the penetrative movement of said implement to regulate the amount of fluid displaced by said member during the feeding operation.

9. In a fluid-control feed, a fluid-operated member, a carrier operatively connected with said member and equipped with a penetrating implement, and means moving with said carrier and influenced by the movement of said implement, as it penetrates the work, to determine the speed of said carrier at all times during the feeding operation.

10. In a fluid-control feed, a fluid-controlled member, a carrier operatively connected with said member and equipped with a penetrating implement, and feeding means consisting in part of a needle-valve moving with said carrier, and governed in its action by the penetrative movement of said implement, whereby the feeding operation is rendered faster or slower accordingly as the amount of penetrative movement be greater or less.

11. In a fluid-control feed, a fluid-controlled member, a carrier operatively connected with said member and equipped with a penetrating implement, and feeding means consisting in part of a spring-actuated needle-valve moving with said carrier, and governed in its action by the penetrative movement of said implement, whereby the feeding operation is rendered faster or slower accordingly as the amount of said penetrative movement be greater or less.

12. In a fluid-control feed, a fluid-controlled member, a carrier operatively connected with said member, and equipped with a penetrating implement, feeding means consisting in part of a spring-actuated needle-valve moving with said carrier, and governed in its action by the penetrative movement of said implement, whereby the feeding operation is rendered faster or slower according as the amount of said penetrative movement be greater or less, and means to vary the tension of the needle-valve spring.

13. In a fluid-control feed, a fluid-controlled member a carrier operatively connected with said member and equipped with a cutting implement, feeding means consisting in part of a spring-pressed needle-valve moving with said carrier, and governed in its action by the penetrative movement of said implement, whereby the feeding operation is rendered faster or slower accordingly as the amount of penetrative movement be greater or less, and an adjustable plug arranged to vary the tension of the needle-valve spring.

14. In a fluid-control feed, a fluid-controlled member a carrier operatively connected with said member and equipped with a penetrating implement, feeding means consisting in part of a spring-pressed needle-valve moving with said carrier, and governed in its action by the penetrative movement of said implement, whereby the feeding operation is rendered faster or slower accordingly as the amount of said penetrative movement be greater or less, an adjustable plug arranged to vary the tension of the needle-valve spring, said plug being provided with a pointer, and a dial in juxtaposition to said pointer, said pointer and dial constituting means for determining the amount of compression of said spring.

15. In a fluid-control feed, a fluid-controlled member, a rising and falling carrier operatively connected with said member and equipped with a penetrating implement, and means under the influence of said implement to govern the descent of said carrier, by the amount of resistance to penetration of the work by said implement.

16. In a fluid-control feed, a fluid-controlled member, a rising and falling carrier operatively connected with said member and equipped with a penetrating implement, and means under the influence of said implement to regulate the displacement of the fluid whereby said carrier is permitted to descend, such means being subject to the resistance to the penetrative movement of said implement.

17. In a fluid-control feed, a fluid-controlled member, a rising and falling carrier operatively connected with said member and equipped with a penetrating implement, and means under the influence of said implement to govern the descent of said carrier, by the amount of resistance to penetration of the work by said implement, such means consisting in part of a needle-valve.

18. In a fluid-control feed, a fluid-controlled member, a rising and falling carrier operatively connected with said member and equipped with a penetrating implement, and means under the influence of said implement to regulate the displacement of the fluid whereby said carrier is permitted to descend, such means being subject to the resistance to the penetrative movement of said implement, and consisting in part of a needle-valve.

19. In a fluid-control feed, a penetrating implement, feed-controlling means comprising a longitudinally-movable spindle provided with a rider to follow the penetrative movement of said implement, and a needle-valve and a seat therefor, the position of said needle-valve relative to said seat being determined by the position of said spindle.

20. In a fluid-control feed a penetrating implement, feed-controlling means comprising a longitudinally-movable spindle provided with a rider to follow the penetrative movement of said implement, a needle-valve and a seat therefor, the position of said needle-valve relative to said seat being determined by the position of said spindle, and a spring arranged to maintain said needle-valve in operative relation to said spindle.

21. In a fluid-control feed, a penetrating implement, feed-controlling means comprising a longitudinally-movable spindle provided with a rider to follow the penetrative movement of said implement, a needle-valve and a seat therefor, the position of said needle-valve relative to said seat being determined by the position of said spindle, and means to prevent said needle-valve from rotating with said spindle.

22. In a fluid-control feed, a penetrating implement, feed-controlling means comprising a longitudinally-movable spindle provided with a rider to follow the penetrative movement of said implement, a needle-valve and seat therefor, the position of said needle-valve being determined by the position of said spindle, a spring arranged to maintain said needle-valve in operative relation to said spindle, and means to prevent said needle-valve from rotating with said spindle.

23. In a fluid-controlled feed, a cylinder, a piston in said cylinder, a carrier operatively connected with said piston and equipped with a penetrating implement, means to force fluid into said cylinder to actuate said piston in one direction, means to admit said fluid to said cylinder when said piston arrives at one end of its travel, means to shut off said fluid from said cylinder when said piston arrives at the other end of its travel, and means to permit the fluid confined by said piston in said cylinder to escape, said last-named means being subject to the resistance to the penetrative movement of said implement.

24. In a fluid-control feed, a cylinder, a piston in said cylinder, a carrier operatively connected with said piston and equipped with a penetrating implement, means to admit fluid to said cylinder and to shut it off therefrom, means to actuate said first-named means, to admit said fluid, when said piston arrives at one end of its travel, means to actuate said first-named means, to shut off said fluid, when said piston arrives at the other end of its travel, and means to permit the fluid confined by said piston in said cylinder to escape, said last-named means being subject to the resistance to the penetrative movement of said implement.

25. In a fluid-control feed, a cylinder, a piston in said cylinder, an implement carrier operatively connected with said piston, a second cylinder opening into said first cylinder and provided with a by-pass, means to force fluid into said second cylinder, and valves in said second cylinder to open the way to said first cylinder and close said by-pass, and to close the former and open the latter, according to the position of said valves.

26. In a fluid-control feed, a cylinder, a piston in said cylinder, an implement carrier operatively connected with said piston, a second cylinder opening into said first cylinder and provided with a by-pass, means to force fluid into said second cylinder, valves in said second cylinder to open the way to said first cylinder and close said by-pass, and to close the former and open the latter, a stem for said valves, and connections between said carrier and stem to actuate said stem at each end of the travel of said carrier.

27. In a fluid-control feed, a cylinder, a piston in said cylinder, an implement carrier operatively connected with said piston, and provided with a projection, a second cylinder opening into the first and provided with a by-pass, means to force fluid into said second cylinder, valves in said second cylinder to open the way to said first cylinder and close said by-pass, and to close the former and open the latter, a stem for said valves, an operating rod operatively connected with said stem, and collars on said rod, said carrier projection being between said collars, and adapted to contact with one or the other of the latter and move said rod, at each end of the travel of said carrier.

28. In a fluid-control feed, a cylinder, a piston in said cylinder, an implement carrier operatively connected with said piston, a second cylinder opening into the first and provided with a by-pass, means to force fluid into said second cylinder, valves to open the way into said first cylinder and close said by-pass, and to close the former and open the latter, a stem for said valves, connections between said carrier and stem to actuate said stem at each end of the travel of said carrier, and auxiliary means to assist said connections in operating said valves.

29. In a fluid-control feed, a cylinder, a piston in said cylinder, an implement carrier operatively connected with said piston, and provided with a projection, a second cylinder opening into the first and provided with a by-pass, means to force fluid into said second cylinder, valves to open the way into said first cylinder and close said by-pass, and to close the former and open the latter, a stem for said valves, a bell-crank-lever pivotally connected with said stem, and having a heel, an operating rod pivotally connected with said bell-crank-lever, collars on said rod, said carrier projection being between said collars, and adapted to contact with the one or the other of the latter and move said rod, at each end of the travel of said carrier, and a spring-pressed member in contact with said bell-crank-lever heel and adapted to assist said lever as it approaches the end of its movement in either direction.

30. In a fluid-control feed, a penetrating implement, and a member adapted to remain in constant contact with said implement, and a fluid-controlling member operated by said first-named member.

31. In a fluid-control feed, a cylinder, a piston in said cylinder, an implement carrier operatively connected with said piston, means to force fluid into said cylinder to actuate said piston in one direction, means to conduct said fluid away from the fluid side of said piston, and opening and closing means interposed in such conducting means.

32. In a fluid-control feed, a cylinder, a piston therein, a carrier operatively connected with said piston and equipped with a penetrating implement, means to force fluid into said cylinder to actuate said piston in one direction, conducting means leading from the fluid side of said piston, feed-controlling means for the fluid which passes through said conducting means, said feed-controlling means being controlled by the resistance to the penetrative movement of said implement, and means to open said conducting means to said feed-controlling means, and to close the same.

33. In a fluid-control feed, a cylinder, a piston in the same, a carrier operatively connected with said piston and equipped with a penetrating implement, means to force fluid into said cylinder to actuate said piston in one direction, conducting means leading from the fluid face of said piston, feed-controlling means for the resistance to the fluid which passes through said conducting means, said feed-controlling means being controlled by the penetrative movement of said implement, and means to open said conducting means to said feed-controlling means, to close said conducting means, and to by-pass the fluid past said feed-controlling means.

34. In a fluid-control feed, a cylinder, a piston therein, an implement carrier operatively connected with said piston, means to force fluid into said cylinder to actuate said piston in one direction, conducting means leading from the fluid side of said piston, and opening and closing means in said conducting means, adapted to be spring-pressed into closed position.

35. In a fluid-control feed, a cylinder, a piston therein, an implement carrier operatively connected with said piston, means to force fluid into said cylinder to actuate said piston in one direction, conducting means leading from the fluid side of said piston, opening and closing means in said conducting means, adapted to be spring-pressed into closed position, and a latch arranged to hold said opening and closing means against the resiliency of its spring.

36. In a fluid-control feed, a cylinder, a piston therein, an implement carrier operatively connected with said piston, means to force fluid into said cylinder to actuate said piston in one direction, conducting means leading from the fluid side of said piston, opening and closing means in said conducting means, adapted to be spring-pressed into closed position, a latch arranged to hold said opening and closing means against the resiliency of its spring, and means adapted to be set to withdraw said latch from locking engagement.

37. In a fluid-control feed, a cylinder, a piston therein, a carrier operatively connected with said piston and equipped with a penetrating implement, means to force fluid into said cylinder to actuate said piston in one direction, conducting means leading from the fluid side of said piston, an interposed valve casing in said conductive means, a seat and a needle-valve therefor in said casing, said needle-valve being controlled by the resistance to the penetrative movement of said implement, and a valve in said casing adapted to open and close the way to said needle-valve.

38. In a fluid-control feed, a cylinder, a piston therein, a carrier operatively connected with said piston and equipped with a penetrating implement, means to force fluid into said cylinder to actuate said piston in one direction, conducting means leading from the fluid side of said piston, an interposed valve casing in said conductive means, a seat and a needle-valve therefor in said casing, said needle-valve being controlled by the resistance to the penetrative movement of said implement, and a valve in said casing adapted to close the same, to open the way to said needle-valve seat, and to close such way and open a way past said seat.

39. In a fluid-control feed, a cylinder, a piston therein, a carrier operatively connected with said piston and equipped with a penetrating implement, means to force fluid into said cylinder to actuate said piston in one direction, conducting means leading from the fluid side of said piston, an interposed valve casing in said conductive means, a seat and a needle-valve therefor in said casing, said needle-valve being controlled by the resistance to the penetrative movement of said implement, and a spring-pressed valve in said casing adapted to open and close the way to said needle-valve seat, the spring for said valve normally tending to force the valve into closed position.

40. In a fluid-control feed, a cylinder, a piston in said cylinder, a hollow plunger to which said piston is attached, said plunger opening through the fluid side of said piston, a carrier operatively connected with said plunger and equipped with a penetrating implement, means to force fluid into said cylinder to actuate said piston in one direction, conducting means leading from said plunger, feed controlling means for the fluid which passes through said conducting means, said feed-controlling means being controlled by the resistance to the penetrative movement of said implement, and means to open said conducting means to said feed-controlling means, and to close the same.

41. In a fluid-control feed, a cylinder, a piston in said cylinder, a hollow plunger to which said piston is attached, said plunger opening through the fluid side of said piston, a carrier operatively connected with said plunger and equipped with a penetrating implement, means to force fluid into said cylinder to actuate said piston in one direction, conducting means leading from said plunger, feed-controlling means for the fluid which passes through said conducting means, said feed-controlling means being controlled by the resistance to the penetrative movement of said implement, means to open said conducting means to said feed-controlling means, to close said conducting means, and to by-pass the fluid past said feed-controlling means.

42. In a fluid-control feed, a cylinder, a piston therein, an implement carrier operatively connected with said piston, conducting means leading from the fluid side of said piston, means to force fluid into said cylinder to actuate said piston in one direction, a valve casing, interposed in said conducting means, a needle-valve and its seat in said casing, a valve in said casing adapted to open and close the way to said seat, an operating member for the said last-named valve, means to stop said member when it arrives at a position where the connected valve is closed, a spring arranged to force said member toward said position, and a latch adapted to detain said member when it is in position where the connected valve is open.

43. In a fluid-control feed, a cylinder, a piston therein, an implement carrier operatively connected with said piston, conducting means leading from the fluid side of said piston, means to force fluid into said cylinder to actuate said piston in one direction, a valve casing, interposed in said conducting means, a needle-valve and its seat in said casing, a valve in said casing adapted to open and close the way to said seat, and to carry the fluid past said seat, an operating member for said last-named valve; means to limit the movement of said member in both directions, and means to lock said member temporarily when the latter is in an intermediate position.

44. In a fluid-control feed, a cylinder, a piston therein, an implement carrier operatively connected with said piston, conducting means leading from the fluid side of said piston, means to force fluid into said cylinder to actuate said piston in one direction, a valve casing, interposed in said conducting means, a needle-valve and its seat in said casing, a valve in said casing adapted to open and close the way to said seat, and to carry the fluid past said seat, an operating member for said last-named valve, said member being spring-pressed in one direction, means to limit the movement of said member in both directions, and means to lock said member temporarily when the latter is in an intermediate position.

45. In a fluid-control feed, a valve casing having an outlet, and being provided with plug-valve and needle-valve seats, said inlet communicating with said outlet by way of said needle-valve seat, a needle-valve for its seat, and a plug valve in its seat, said plug valve having ports to open the way from said inlet to said needle-valve seat, and from said inlet directly to said outlet, and said plug valve being adapted to close the way from said inlet to said needle-valve seat, and to close said inlet altogether.

46. In a fluid-control feed, a valve casing having an inlet and an outlet, and being provided with plug-valve and needle-valve seats, said inlet communicating with said outlet by way of said needle-valve seat, a needle-valve for its seat, a plug valve in its seat, said plug valve having ports to open the way from said inlet to said needle-valve seat, and from said inlet directly to said outlet, and said plug valve being adapted to close the way from said inlet to said needle-valve seat, and to close said inlet altogether, an operating member for said plug valve, means to limit the movement of said member in both directions, and locking means to hold said member in an intermediate position, such locking means comprising a spring-pressed latch in said casing in engaging relation to said member.

47. In a fluid-control feed, a movable implement carrier, a valve casing mounted on said carrier, said casing having an inlet and an outlet, and being provided with plug-valve and needle-valve seats, said inlet communicating with said outlet by way of said needle-valve seat, a needle-valve for its seat, a plug valve in its seat, said plug valve having ports to open and close the way from said inlet to said needle-valve seat, and from said inlet directly to said outlet, an operating member for said plug valve, said member being spring-pressed in one direction, means to limit the movement of said member in both directions, locking means to hold said member in an intermediate position, such locking means comprising a spring-pressed latch, in said casing in engaging relation to said member, rocking members mounted on said casing and arranged to actuate said latch against the resiliency of its spring, such rocking members consisting in part of a dog, and a member capable of being positioned in the path of said dog, for the purpose of causing said rocking members to be actuated and said latch to be withdrawn from locking engagement with said plug-valve operating member, whereby the latter is released to its spring.

48. In a fluid-control feed, a cylinder, a piston therein, means to force fluid into said cylinder to actuate said piston in one direction, a carrier operatively connected with said piston and equipped with a penetrating implement, fluid-feed-controlling members mounted on said carrier, and conducting means leading from the fluid side of said piston to said fluid-feed-controlling members, the latter being governed by the resistance to the penetrative movement of said implement.

49. In a fluid-control feed, a rising and falling carrier equipped with a penetrating implement, means to cause said carrier to rise by the force exerted by the fluid, and means to control said fluid to permit said carrier to descend only as fast as said implement penetrates the work.

50. In a fluid-control feed, a rising and falling carrier equipped with a penetrating implement, means to force said carrier to ascend by the force exerted by the fluid, means to control said fluid to permit said carrier to descend only so fast as said implement penetrates the work, and means to by-pass said fluid to permit said carrier to descend at an accelerated speed.

JULIAN L. PERKINS.
FRANK W. SICKLES.

Witnesses:
F. A. CUTTER,
T. F. DWIGHT.